D. A. MORTON.
Carriage-Spring.
No. 551.
Patented Jan. 9, 1838.
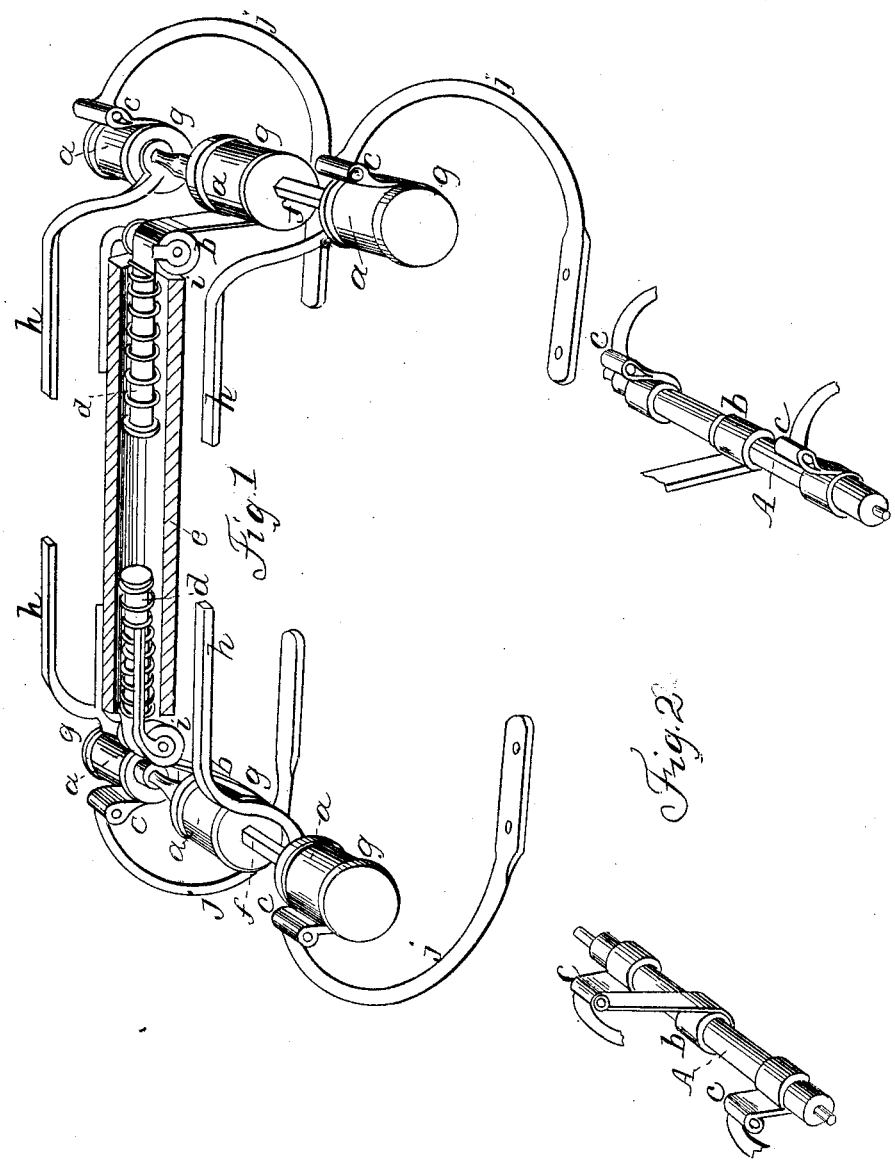

UNITED STATES PATENT OFFICE.

DAVID A. MORTON, OF GROTON, NEW YORK.

MODE OF ATTACHING SPRINGS TO CARRIAGES.

Specification of Letters Patent No. 551, dated January 9, 1838.

*To all whom it may concern:*

Be it known that I, DAVID A. MORTON, of Groton, in the county of Tompkins and State of New York, have invented a new and useful Improvement on Carriage-Springs; and I do hereby declare that the following is a full and exact description.

The nature of my invention consists in the combination of two rollers, (a a Figure 2) (see the drawing) and three straps, b and c c Figs. 1 and 2 attached to each roller, with horizontal spiral springs (d), Fig. 1.

To enable others to make and use my invention, I will proceed to describe its construction and operation.

I vary the number and size of the springs (d) so as to adapt them to the load the carriage is designated to sustain. I inclose the springs (d) in a case, (e) or place them on rods. When I make use of a case, (e) I make it twice the length of the springs, (d) placing the springs, or spring, (as the case may be) designed for one end of the carriage, in one end of the case, (e) and those, or that, designed for the other end of the carriage, in the other end of the case (e). I fasten the case (e) substantially to the center of the under side of the body. If there be more than one spring (d) in each end of the case, (e) I place a small iron rod through the coil of each spring, (d) connecting them together at one end so as to form a loop which receives one end of the strap (b). On the other ends of the rods, I fasten a thin piece of iron, corresponding in width with the diameter of the springs, (d) to prevent them from drawing through the springs, (d). To prevent the springs (d) from drawing out of the case, (e) I put two spikes through it at the end of each spring, so as to leave an aperture for the rods to pass through. If there be but two springs, (d) one in each end of the case, (e) the use of the rods above mentioned may be superseded, by making the straps (b b) of sufficient length to pass through the coil of the springs, (d) fastening the ends of the straps (b b) to the ends of the springs (d). When I place the springs (d) on rods, instead of inclosing them in a case, (e) I make the rods twice the length of the springs, (d) placing two springs on one rod, the rods passing through the coils of the springs (d). The springs (d) on one end of the rods, serve for the fore end of the carriage, and those on the other end, for the hind end of the carriage. I attach the rods to the under side of the body, so that the springs (d) occupy the same place as if they were inclosed in a case, (e) as above described.

I make use of two instruments of iron to contract the springs (d). I place these irons on the center of the rods, the rods passing through them. They should be made in a form convenient to attach the strays (b b) to them. These irons come in contact with the ends of the springs, (d) one of which serves to contract the fore springs, and the other, the hind springs. If the body of the carriage is not of sufficient length to admit of a case, (e) or rods, twice the length of the springs, I make the case, or rods, of the same length with the springs.

I make the rollers (a a) of wood or iron. When made of iron, each roller consists of a shaft, (f) Fig. 1 and three cylinders; (g g g) one of which is placed on the center, the others, on the ends of the shaft; (f) the shaft (f) passing through the center of them. These cylinders (g g g) somewhat resemble a spool in form; the grooves being of sufficient width and depth to receive 12 or 15 inches in length of the straps, (b and c) which are rolled up in them. When the rollers (a a) are made of wood, each one consists of but one piece of timber. I insert gudgeons in the ends of the rollers, (if made of wood) on which they revolve. If the rollers (a a) be made of iron, that part of the shaft (f) which passes through the body-loops (h) serves for gudgeons. I attach the rollers (a a) to the ends of the carriage body, by body-loops; (h h h h) the gudgeons of the rollers (a a) passing through the lower ends of them. If the rollers (a a) be placed lower than the springs, (d) I attach two small pulleys (i i) to the under side of the body, near the ends, over which the straps (b b) pass; the upper surface of the pulleys (i i) being on a horizontal line with the springs (d). The use of these pulleys, is to keep that portion of the straps (b b) between the pulleys (i i) and the springs (d) in a horizontal direction, which will appear obviously necessary. I make the ends of the straps, (b b, and c c c c) which are attached to the rollers, (a a) thin, shaving them to an edge. I attach the other ends of the straps (b b) to the irons by which the springs (d) are contracted. I then fasten the other ends of the straps (*b b*) to the lower surface of the center grooves, by putting a small iron pin through each strap, (*b b*) near the ends, into the cylinder, (*g*) or otherwise. To prevent the straps from slipping, I roll up 12 or 15 inches in length of them in the grooves. I attach one end of the straps (*c c c c*) to the lower surface of the grooves at the ends of the rollers, (*a a*) in the same manner as above described; but in rolling up a portion of them in the grooves, I wind them in an opposite direction. I fasten the other ends of them to the jacks (*j j j j*) in any permanent manner most convenient.

It will appear obvious, that when the body is thus suspended, and the carriage is in operation, a portion of all the straps are, alternately unrolling, and rolling up in the grooves. When the body settles, a portion of the straps (*c c c c*,) are thrown off, and a portion of the straps (*b b*,) are taken up at the same time; which will consequently contract the springs (*d*). When the body rises, a portion of the straps (*c c c*,) are taken up, and a portion of the straps (*b b*,) are, at the same time, thrown off; which will necessarily elongate the springs.

What I claim as my invention, and desire to secure by Letters Patent, is—

The combination of the above-described rollers, (*a a*) the straps (*b b*, and *c c c c*,) and the irons by which the springs are contracted, with horizontal spiral springs, (*d*) substantially attached to the under side of the carriage body, as herein described.

DAVID A. MORTON.

Witnesses:
S. S. WILLIAMS,
BENJAMIN WILLIAMS.